(12) United States Patent
Balachandran et al.

(10) Patent No.: US 6,630,116 B2
(45) Date of Patent: Oct. 7, 2003

(54) METHOD TO REMOVE AMMONIA USING A PROTON-CONDUCTING CERAMIC MEMBRANE

(75) Inventors: Uthamalinga Balachandran, Hinsdale, IL (US); Arun C. Bose, Pittsburgh, PA (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 32 days.

(21) Appl. No.: 09/917,615

(22) Filed: Jul. 25, 2001

(65) Prior Publication Data

US 2002/0021995 A1 Feb. 21, 2002

Related U.S. Application Data

(63) Continuation-in-part of application No. 09/401,779, filed on Sep. 22, 1999, now abandoned, which is a continuation-in-part of application No. 09/192,115, filed on Nov. 13, 1998.

(51) Int. Cl.$^7$ .............................. C01B 3/04; C01B 3/08; B01J 8/00
(52) U.S. Cl. ..................... 423/351; 422/213; 423/658.2
(58) Field of Search ............................. 502/4; 423/237, 423/351, 43, 658.2, 45, 47, 56, 213; 96/4

(56) References Cited

U.S. PATENT DOCUMENTS 4,329,157 A * 5/1982 Dobo et al. ..................... 55/16
5,183,788 A * 2/1993 Jacobson et al. ............... 502/4
5,821,185 A * 10/1998 White et al. ................... 502/4

* cited by examiner

*Primary Examiner*—Wayne A. Langel
*Assistant Examiner*—Jonas N. Strickland
(74) *Attorney, Agent, or Firm*—Mark LaMarre; Mark Dvorscak; Paul A. Gottlieb

(57) ABSTRACT

An apparatus and method for decomposing $NH_3$. A fluid containing $NH_3$ is passed in contact with a tubular membrane that is a homogeneous mixture of a ceramic and a first metal, with the ceramic being selected from one or more of a cerate having the formula of $M'Ce_{1-x}M''_{3-\delta}$, zirconates having the formula $M'Zr_{1-x}M''O_{3-\delta}$, stannates having the formula $M'Sn_{1-x}M'O_{3-\delta}$, where M' is a group IIA metal, M" is a dopant metal of one or more of Ca, Y, Yb, In, Nd, Gd or mixtures thereof and $\delta$ is a variable depending on the concentration of dopant and is in the range of from 0.001 to 0.5, the first metal is a group VIII or group IB element selected from the group consisting of Pt, Ag, Pd, Fe, Co, Cr, Mn, V, Ni, Au, Cu, Rh, Ru and mixtures thereof. The tubular membrane has a catalytic metal on the side thereof in contact with the fluid containing $NH_3$ which is effective to cause $NH_3$ to decompose to $N_2$ and $H_2$. When the $H_2$ contacts the membrane $H^+$ ions are formed which pass through the membrane driving the $NH_3$ decomposition toward completion.

9 Claims, 1 Drawing Sheet

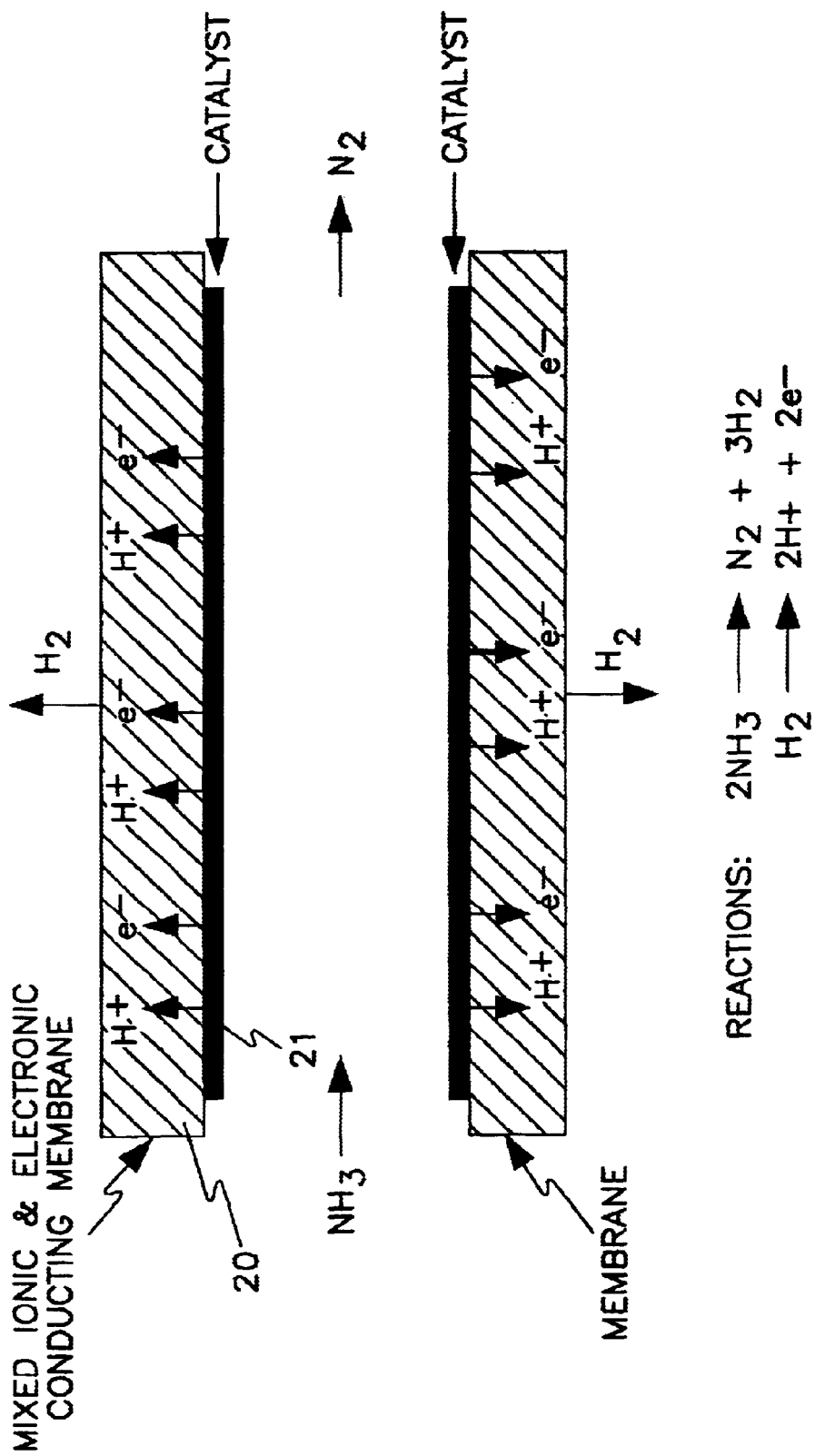

METHOD TO REMOVE AMMONIA USING A PROTON-CONDUCTING CERAMIC MEMBRANE

RELATED APPLICATION

This is a continuation-in-part application of U.S. application Ser. No. 09/401,779, filed Sep. 22, 1999, now abandoned, which was a continuation-in-part application of U.S. Application Ser. No. 09/192,115, filed Nov. 13, 1998.

CONTRACTUAL ORIGIN OF THE INVENTION

The United States Government has rights in this invention pursuant to Contract Number W-31-1 09-ENG-38 between the United States Government and Argonne National Laboratory.

BACKGROUND OF THE INVENTION

This invention relates to the catalytic decomposition of ammonia ($NH_3$) from the gas feed to a turbine combustor, as a method to reduce $NO_x$ emissions in fossil-fuel fired power plants. In this invention, the efficient removal of ammonia from a gas mixture by catalytic decomposition is achieved by: 1) making a tube-shaped proton-conducting ceramic membrane; 2) coating the inner surface of the membrane with a film of material that will catalyze the reactions: $2NH_3 \rightarrow N_2 + 3H_2$; and, 3) passing the 2H+ ions through the internal space of the coated tube.

$NH_3$ that is present in the gaseous feed to the turbine in a power generating plant represents a small, but significant source, of fuel-bound $NO_x$ emitted by such generating plants. In a conventional packed-bed reactor, the rate at which ammonia is decomposed into nitrogen is limited by equilibrium conditions. At temperatures of approximately 600° C., only about 53% of the ammonia is decomposed in a conventional packed bed reactor. It should be possible to achieve significant enhancement over the equilibrium conversion rate of the ammonia in the feed stream, if one or more of the reaction products are selectively removed from the reaction zone. In a paper entitled "*Catalytic Decomposition of Ammonia in a Membrane Reactor,*" Journal of Membrane Science 96 (1994) pgs. 259–234, the disclosure of which is incorporated herein by reference, Collins and Way (1994) have shown that ammonia decomposition can be increased to over 94%, at 600° C. in a membrane reactor where the chemical conversion and product purification, by separation, take place in the same device. Collins and Way deposited a thin palladium (Pd), membrane on the inside surface of a porous alumina tube and a supported $Ni/Al_2O_3$ catalyst was used to decompose ammonia. In the decomposition experiments they conducted, comparing a packed bed Pd-membrane reactor with a conventional packed bed reactor, using a similar catalyst in both situations, ammonia decomposition of over 94% was achieved in the Pd-membrane reactor, as compared with only a 53% decomposition in the conventional packed bed reactor at 600° C. In these experiments, hydrogen produced in the reaction was removed from the reaction zone by the thin Pd-film, and this shifted the equilibrium to favor decomposition of $NH_3$. The advantage of the Pd-membrane reactor was even more pronounced at lower temperatures. However, the Pd membrane has several limitations. Most significantly is the fact that the Pd-membrane is poisoned by CO present in excess of 5% of the gas composition. CO is a major constituent of the products of coal gasification. Other limitations include degradation with time at high temperatures, of the hydrogen flux capability of the Pd-membrane and cracks that result from phase transitions occurring at high temperatures. In addition, Pd-membranes are expensive.

Many membrane systems have been developed in efforts to efficiently extract target material from feed streams. Some of these membrane systems (U.S. Pat. Nos. 5,030,661, 5,645,626, and 5,725,633) are synthetic based, and incorporate polymides and polyethersulphones. Unfortunately, such organic membranes are susceptible to chemical damage from $H_2S$ and aromatics. Such membranes also have limited temperature tolerance.

Other membrane systems (U.S. Pat. Nos. 4,857,080, 5,366,712, 5,652,020, and 5,674,301) require a multi-component approach wherein a hydrogen permeable metal, such as palladium or platinum overlays a porous ceramic substrate which is provided for strength. Such membranes have limited tolerance to elevated temperatures and are susceptible to chemical reaction to $H_2S$ and CO. Furthermore, the multi-component, heterogenous, nature of these membranes adds cost and lessens the reliability of any process which uses them.

Proton-exchange membranes have high proton conductivities, and as such, are currently in development for fuel-cell applications and hydrogen pumps. One such application is disclosed in U.S. Pat. No. 5,094,927, issued to Bauke on Mar. 10, 1992. However, inasmuch as these membranes have relatively low electronic conductivities, they are not viable for hydrogen recovery scenarios, primarily because these membranes require the application of an electric potential to drive proton transport.

We have developed a dense ceramic membrane and have demonstrated the utility of this membrane to separate hydrogen from gas streams containing 33% CO [balance: 66% $H_2$, 1% $CO_2$], at temperatures in excess of 600° C. This dense ceramic membrane operates in a non-galvanic mode (without external power circuitry). We have also shown that the hydrogen flux through our ceramic membrane increases as the thickness decreases. We also expect that it will be cheaper to fabricate a ceramic membrane compared to the cost of a Pd-membrane.

SUMMARY OF THE INVENTION

It is an object of the present invention to provide a method of decomposing ammonia that overcomes many of the disadvantages of the prior art.

Another object of the present invention is to provide a membrane to extract hydrogen from a myriad of fluids, particularly from the decomposition products of ammonia, aided by the use of a catalyst.

Yet another object of the present invention is to provide a proton- and electron-exchange transfer membrane for use as a reactor for the decomposition of ammonia. A feature of the membrane is that the membrane is a homogenous phase comprised of modified ceramic and a metal to induce electronic conductivity. An advantage of the membrane is that it can be formulated to exhibit tolerance to high temperatures and various chemicals inherent with ammonia-containing feedstream processing, such chemicals including $H_2O$, $H_2S$, CO and $CO_2$. Another advantage is its low cost of fabrication.

Still, another object of the present invention is to provide a hydrogen-transfer membrane having no interconnected porosity with a high selectivity for hydrogen at the exclusion of other non-ionized materials. An advantage of the invention is a two to three-fold increase in hydrogen permeation rates compared to ceramic-based substrates which are not homogenized with electrically conductive materials.

The invention also provides a method for separating hydrogen from the decomposition products of ammonia comprising contacting the decomposition products with a first surface of a membrane to create a solid-gas interface; maintaining the solid-gas interface at a temperature sufficient to allow transport of positive hydrogen ions through the membrane to a second surface of the membrane; and allowing the now-transported positive hydrogen ions to form hydrogen molecules, thereby driving the decomposition reaction of ammonia approaching 94%.

BRIEF DESCRIPTION OF THE DRAWING

The present invention together with the above and other objects and advantages may best be understood from the following detailed description of the embodiment of the invention illustrated in the drawing, wherein:

The FIGURE is a schematic representation of a reactor mechanism for the disassociation of ammonia.

DETAILED DESCRIPTION OF THE INVENTION

The invention provides mixed protonic/electronic conductors for use in the form of dense ceramic membranes in the configuration of a tubular reactor 20 having a suitable catalyst 21 on the interior thereof that efficiently and economically decomposes ammonia and separates hydrogen from the decomposition products of ammonia. This separation occurs in a nongalvanic mode. The critical properties of the membrane include high protonic and electronic conductivities (i.e. protonic and electronic transport characteristics), catalytic behavior during the dissociation and recombination of hydrogen, and good material stability in hostile thermal and chemical environments. Additionally, the membrane should be nonporous in that contiguous channels are not available for gaseous mass flow. The membrane provides a hydrogen ion-transfer medium having no interconnected porosity with a high selectivity for hydrogen at the exclusion of other non-ionized materials.

The tubular membrane 20 having a suitable catalyst 21 thereon operates at a myriad of temperatures, including from 400° C. to 1,000° C., preferably above 600° C., for decomposition. Catalysts for ammonia decomposition are well known in the art. However, one such catalyst is fine Ni powder supported on an alumina surface. Generally, the tubular membrane 20 comprises a composite, mechanical mixture of a ceramic component and a metal component such that the mixture is homogenous throughout.

One requirement of the ceramic component of the membrane is that it has a high proton conductivity. Generally, such materials are acceptor doped oxides. One class of suitable oxides are the cerates having the following general formula $M'Ce_{1-x}M''_xO_{3-\delta}$, the zirconates having the general formula $M'Zr_{1-x}M''_xO_{3-\delta}$ and the stannates having the general formula $M'Sn_{1-x}M''_xO_{3-\delta}$ where M' is a Group IIA metal, M" is a dopant metal, $\delta$ is a variable which depends on the concentration of the dopant, but is greater than 0.001 and less than 0.5 and x is a variable from 0.05 to 0.3. Generally, the suitability of the proton conductivity ceramic component candidates will depend on the stability requirements of the fabricated homogeneous composite. For example, more stable zirconate-based ceramic components may be preferable to cerates in extreme process environments. Suitable species of the above-discussed ceramic genuses include $Fe:LiNbO_3$, $Y:SrCeO_3$, $Ni:KTaO_3$, $Y:SrZrO_3$, $Y:BaSnO_3$, $Nd:BaCeO_3$, $SrCe_{1-x}M''_xO_{3-\delta}$, $BaCe_{1-x}M''_xO_{3-\delta}$ and $BaCe_{0.8}Y_{0.2}O_{3-\delta}$. The last species ($BaCe_{0.8}Y_{0.2}O_{3-\delta}$) is an exemplary example of the BCY-ceramic referred to throughout the specification.

Generally, the metal component of the ceramic membrane can be any electron-conducting metal. For example, the inventors have found that the incorporation of a Group III and/or IB element decreases the interfacial resistance and increases the electronic conductivity of any membrane produced from the composite, both of which would increase hydrogen permeation. One group of exemplary catalytic metal components (i.e., electron-transporting material) comprises platinum, palladium, nickel, iron, cobalt, chromium, manganese, vanadium, silver, gold, copper, rhodium, ruthenium, or combinations thereof.

When the two components are prepared and mixed in the manner described herein, the composite material results, having the superior electronic conduction and proton conduction characteristics discussed below. As a result, transport of hydrogen ions is enhanced from two to three-fold compared to transport rates seen in typical ceramic based structures which do not incorporate electron transport materials.

A ceramic-based material as disclosed above is combined with an appropriate metal to arrive at the composite material. Initial preparation of, for example, BCY material includes grinding together barium carbonate, cerium oxide and yttrium oxide and subsequently adding isopropyl alcohol to achieve homogeneity of the mixture. Milling the homogenous mixture is performed overnight. The resulting milled mixture is heated to dryness and subsequently calcined several times until the desired phase purity is achieved. A more complete protocol of ceramic-material preparation is found in Jie Guan et al. "Transport Properties of $BaCe_{0.95}Y_{0.05}O_{3-x}$ Mixed Conductors for Hydrogen Separation." *Solid State Ionics* 100, 45–52 (1997, Elsevier Science B. V., Amsterdam), and incorporated herein by reference.

The resulting ceramic material generated from the protocol disclosed in the previous paragraph is then combined with the electron-conducting material. In one method, ceramic powders and powders of electron-conducting metal are vibratory-milled in isopropyl alcohol for approximately 24 hours, subsequently dried and calcined until desired phase purity is achieved, and screened to 100 mesh. The resulting powder is then either uniaxially pressed into pellets (=2 cm in diameter) or tape-casting slips are formulated with a solvent/binder/plasticizer system. In the later case, the powders are dispersed in the organic system, cast onto a glass substrate, and leveled to a desired thickness. A predetermined diameter die is used to punch out membrane disks. Then the organics are removed through thermal decomposition by slow heating to approximately 450° C. in flowing oxygen maintained at a pressure of =2.5 torr. The resulting tapes and pellets were then sintered at temperatures not to exceed the melting temperature of either material comprising the homogenous composite. Sintering temperatures of from 1300° C. to 1600° C. are typical. Such sintering is necessary to prevent inter-porosity which is detrimental to a hydrogen-specific transport mechanism. The addition of sintering aid (designated therein as "SA") such as 3 $BaO.B_2O_3$, results in improvement in mechanical properties without affecting the hydrogen permeation rates. Other sintering aids are well known and may be used without detrimental effect. $SrO—B_2O_3$, $CaO—B_2O_3$ and Ba/Ca/Sr fluorites are alternative sintering aids. This is because a sintering aid results in the formation of higher membrane density, and therefore lower inter-porosity of the final homogenous membrane form. The addition of 0.5 weight percent of a sintering aid resulted in an increase in density of from 92 percent theoretical density to approximately 98 percent of theoretical density. The addition of the sintering aid did not result in a degradation of the permeation rate.

A more complete protocol for combining the ceramic material with the conducting metal to form the cermets described herein is found in pp. 44–46 of Jie Guan, "CERAMIC MEMBRANES OF MIXED IONIC-ELECTRONIC CONDUCTORS FOR HYDROGEN SEPARATION," A Dissertation Presented to the Academic Faculty of the Georgia Institute of Technology, June 1998. The entire dissertation is publically available at the Institute, and incorporated herein by referred.

Volume percent of the conducting metal to the entire homogeneous membrane can vary from 20 to 60 percent. Acceptable hydrogen permeation rates were obtained with Nickel chosen as the catalytic metal, and present at approximately 40 volume percent to the membrane, overall.

In summary, the membrane serves to first ionize hydrogen gas contained in a feed fluid to its respective protons. Transport of the ions then occurs through the membrane at a rate that is roughly inversely proportional to the thickness of the membrane.

To maximize the hydrogen permeability, the electronic and protonic conductivities should be comparable in magnitude, and the ratio of the two transference numbers should approach unity.

In hydrogen permeation using the invented composites (such as a Ni-BCY cermet), the driving force is the electrochemical potential difference across the membrane, or approximately the hydrogen concentration difference. It was found that cermet permeation tests revealed that the Nernst potential is not very sensitive to the operating temperatures discussed herein. In essence, the effective potential equals the Nernst potential minus the polarization. At relatively high temperatures utilized herein, polarization is lower. This results in the effective potential being higher. Also, the ambipolar conductivity (i.e. the ratio of product of electronic and protonic conductivities to the sum of the two conductivities) is higher. In essence, the invented membrane facilitates more of a potentiostatic process, compared to the galvanic scenarios discussed supra. This phenomenon provides much higher permeation rates even at lower temperatures. Permeation rates of between 0.1 and 50 cm$^3$min$^-$$^1$cm$^{-2}$ are attainable using the invented membrane and process disclosed herein, particularly if even thinner membranes can be utilized.

Catalytic decomposition of ammonia in the gas feed to the turbine is a potential method to reduce NO$_x$ emissions in fossil-fuel fired power plants. In a conventional packed-bed reactor the decomposition reaction (ammonia decomposing into nitrogen and hydrogen) is limited by equilibrium conditions. At 600° C., only about =53% of ammonia is decomposed in a conventional packed bed reactor. It is possible to achieve significant enhancement over the equilibrium conversion of the feed stream if one or more reaction products are selectively removed from the reaction zone. Collins and Way deposited a thin (≈12 micron) palladium membrane on the inside surface of a porous alumina tube. A supported Ni/Al$_2$O$_3$ catalyst was used to decompose ammonia. They conducted ammonia decomposition experiments in a packed bed Pd-membrane reactor and a conventional packed bed reactor (same catalyst used in both reactors) under the same conditions. The feed gas contained ≈0.335 mole % ammonia, 48% nitrogen, 20% hydrogen, and 31.665% helium. As indicated above, ammonia decomposition over 94% was achieved in the Pd-membrane reactor compared to a decomposition approximately 53% in the conventional packed bed reactor at 600° C. Hydrogen produced due to the decomposition of ammonia was removed from the reaction zone by the thin Pd-film and this shifted the equilibrium favorably. The advantage of the Pd-membrane reactor was even more pronounced at lower temperatures.

The Pd membrane has certain limitations. For example, its hydrogen flux seem to degrade with time at high temperatures, undergoes a phase transition and results in crack formation, and is expensive. As stated, we have developed the disclosed dense ceramic membranes and demonstrated hydrogen separation from gas streams containing 33% CO. The dense ceramic membrane operates in a non-galvanic mode (without external power circuitry). We have also shown that the hydrogen flux through the ceramic membrane increases as the membrane thickness decreases. Therefore, our invention is to use thin films of the dense mixed-conducting membrane instead of the Pd-film for ammonia decomposition. Our membrane reactor system can handle the gas feed that contains CO. A schematic of ammonia decomposition is also enclosed.

Referring to The FIGURE, there is disclosed a tubular reactor 20 of the above-described ceramic having a catalyst 21 on the interior thereof. Preferably, the catalyst is fine Ni powder supported on alumina. As seen NH$_3$ enters the reactor 20 and undergoes a decomposition reaction:

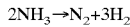

The ceramic membrane ionizes the hydrogen according to the reaction:

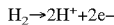

As the hydrogen ions are transported through the walls of the reactor 20, the product hydrogen is removed from the reaction surface. This product removal favors reaction equilibrium, thereby driving the decomposition of NH$_3$ approaching 94% completion. Preferably, the reactor walls have a thickness less than about 1 mm and most preferably in the range of from about 25 to about 100 microns.

While there has been disclosed what is considered to be the preferred embodiment of the present invention, it is understood that various changes in the details may be made without departing from the spirit, or sacrificing any of the advantages of the present invention.

The embodiments of the invention in which an exclusive property or privilege is claimed are defined as follows:

1. A method of decomposing NH$_3$ comprising passing a fluid containing NH$_3$ in contact with a dense ceramic membrane having no interconnected porosity that is a homogeneous mixture of a ceramic and a first metal, wherein the ceramic is selected from the group consisting of a cerate having the formula of M'Ce$_{1-x}$M"$_{1-x}$O$_{3-\delta}$, zirconates having the formula M'Zr$_{1-x}$M"$_x$O$_{3-\delta}$, stannates having the formula M'Sn$_{1-x}$M"$_x$O$_{3-\delta}$, where M' is a group IIA metal, M" is a dopant metal of one or more of Ca, Y, Yb, In, Nd, Gd or mixtures thereof, δ is a variable depending on the concentration of dopant and is in the range of from 0.001 to 0.5, and x is a variable from 0.05 to 0.3, and wherein the first metal is a group VIII or group IB element selected from the group consisting of Pt, Ag, Pd, Fe, Co, Cr, Mn, V, Ni, Au, Cu, Rh, Ru and mixtures thereof, said membrane having a catalytic metal on the side thereof in contact with the fluid containing NH$_3$ which is effective to cause NH$_3$ to decompose to N$_2$ and H$_2$, the H$_2$ in contact with the membrane forming H$^+$ ions which pass through the membrane driving the NH$_3$ decomposition toward completion.

2. The method of claim 1, wherein the first metal is present in the membrane in the range of from about 20 volume percent to about 60 volume percent with respect to ceramic present in the membrane.

3. The method of claim 1, wherein the membrane is in the form of a tube having the catalytic metal on the interior surface thereof.

4. The method of claim 1, wherein the membrane has a thickness of less than 1 mm.

5. The method of claim 1, wherein the membrane has a thickness in the range of from about 25 microns to about 50 microns.

6. The method of claim 1, wherein the decomposition reaction occurs at a temperature in the range of from about 400° C. to about 1000° C.

7. The method of claim 1, wherein the decomposition reaction occurs at a temperature greater than about 600° C.

8. The method of claim 1, wherein the membrane is homogeneous.

9. A tubular reactor comprising a homogeneous mixture of a ceramic and a first metal, wherein the homogeneous mixture is a dense ceramic membrane having no interconnected porosity and wherein the ceramic is selected from the group consisting of a cerate having the formula of $M'Ce_{1-x}M''_xO_{3-\delta}$, zirconates having the formula $M'Zr_{1-x}M''_xO_{3-\delta}$, stannates having the formula $M'Sn_{1-x}M''_xO_{3-\delta}$, where M' is a group IIA metal, M" is a dopant metal of one or more of Ca, Y, Yb, In, Nd, Gd or mixtures thereof, $\delta$ is a variable depending on the concentration of dopant and is in the range of from 0.001 to 0.05, and x is a variable from 0.05 to 0.3, and wherein the first metal is a group VII or a group IB element selected from the group consisting of Pt, Ag, Pd, Fe, Co, Cr, Mn, v, Ni, Au, Cu, Rh, Ru and mixtures thereof, a catalytic metal on the interior surface of said tubular reactor effective to cause $NH_3$ to disassociate when ammonia contacts said catalytic metal at a temperature not less than about 600° C.; whereby $NH_3$ disassociates upon contact with said catalytic metal to produce $N_2$ and $H_2$ and $H_2$ disassociates to $H^+$ ions which pass through the homogeneous mixture to drive the $NH_3$ disassociation reaction toward completion.

* * * * *